H. W. PLEISTER.
CONDUIT OR CABLE CLAMP AND BRIDLE RING.
APPLICATION FILED JAN. 23, 1920.
1,365,618.
Patented Jan. 11, 1921.
3 SHEETS—SHEET 2.
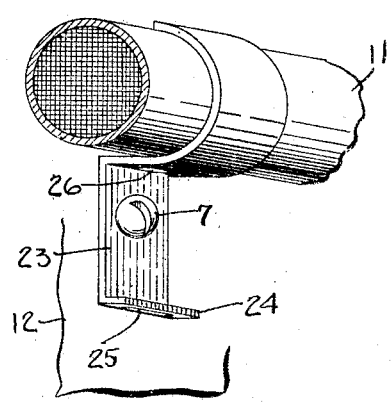
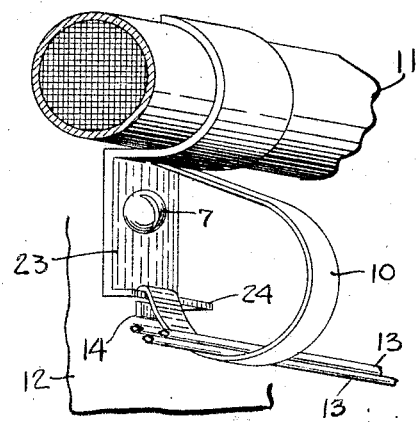
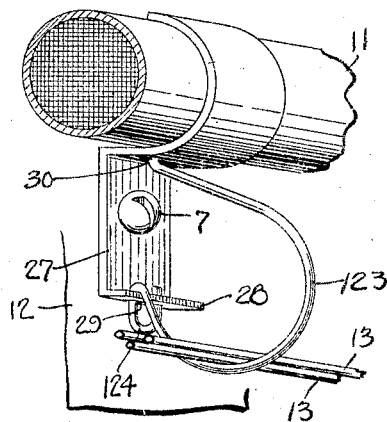
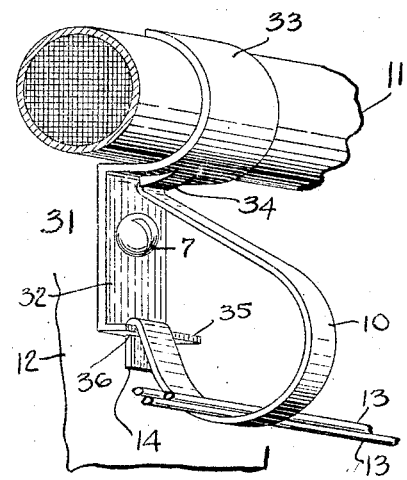
INVENTOR
Henry W. Pleister
BY
Alonho Johnson
ATTORNEY H. W. PLEISTER.
CONDUIT OR CABLE CLAMP AND BRIDLE RING.
APPLICATION FILED JAN. 23, 1920.
1,365,618.
Patented Jan. 11, 1921.
3 SHEETS—SHEET 3.
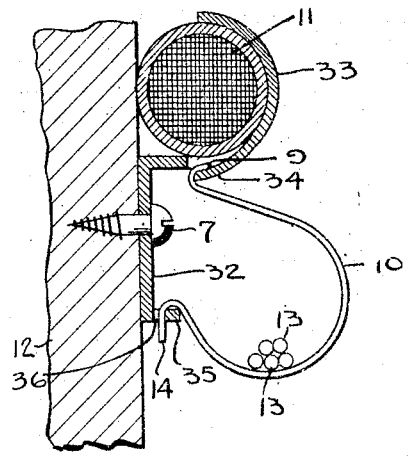
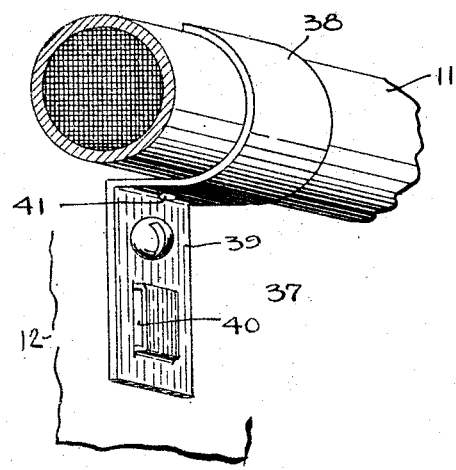
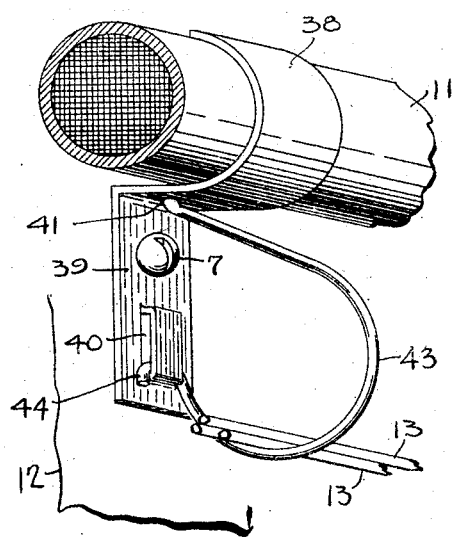
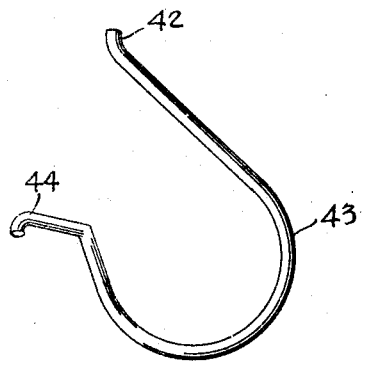
INVENTOR
Henry W. Pleister
BY Alaska Johnson
ATTORNEY

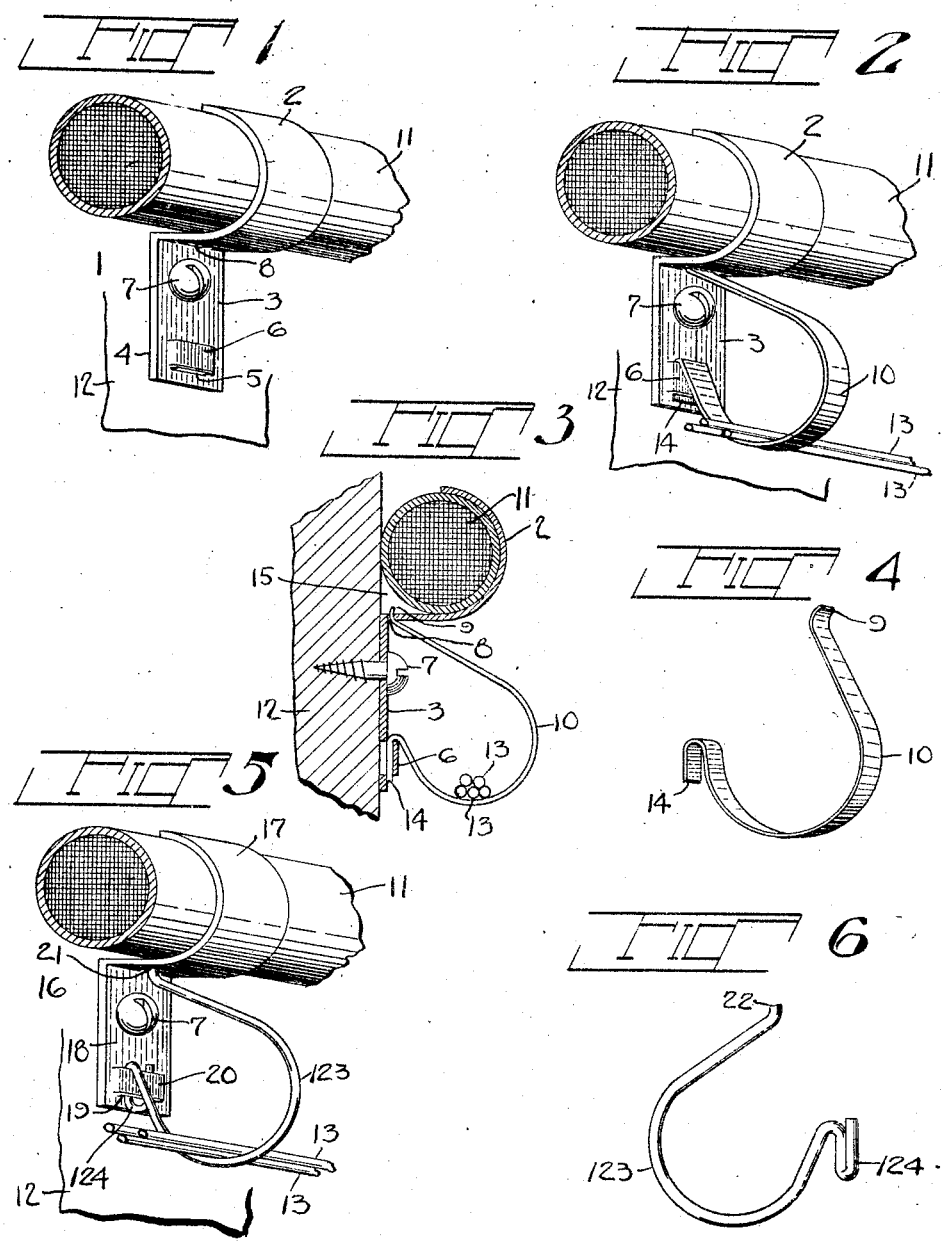

UNITED STATES PATENT OFFICE.

HENRY W. PLEISTER, OF WESTFIELD, NEW JERSEY, ASSIGNOR TO HENRY B. NEWHALL, JR., EXECUTOR OF HENRY B. NEWHALL, DECEASED.

CONDUIT OR CABLE CLAMP AND BRIDLE-RING.

1,365,618.  Specification of Letters Patent.  Patented Jan. 11, 1921.

Application filed January 23, 1920. Serial No. 353,623.

*To all whom it may concern:*

Be it known that I, HENRY W. PLEISTER, a citizen of the United States, residing at Westfield, in the county of Union and State of New Jersey, have invented certain new and useful Improvements in Conduit or Cable Clamps and Bridle-Rings, of which the following is a specification, taken in connection with the accompanying drawings.

My invention relates to the combination of a conduit or cable clamp and bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp provided with a socket or recess to receive the shank of either a flat bridle ring, or the shank of a wire bridle ring, which has preferably, though not necessarily, been properly bent upon itself to form a U-shaped member. Such a member serves to fill the socket or recess and prevents rattling. My invention further relates to means on the cable clamp for receiving and holding the other end of the bridle ring, whether that bridle ring be formed out of flat sheet material or out of round wire.

My invention further relates to a conduit or cable clamp which is preferably formed out of sheet metal and is provided with coöperating surfaces to receive and hold the two ends of a bridle ring. My invention further relates to bridle rings which are used with my improved conduit and cable clamps.

While my conduit or cable clamp is preferably formed out of pressed sheet material as pressed steel, it may be formed from castings, of malleable iron, brass, an alloy, aluminum or any other metal, or it may be made out of pressed fibrous material.

My invention further relates to certain combinations, sub-combinations, articles of manufacture, and details of construction, all of which will be more fully hereinafter described and pointed out in the claims.

In the figures, in which I have shown one embodiment of my invention, the same reference numerals refer to similar parts in the several figures.

Figure 1 is a perspective view of my conduit and cable clamp and of a cable which it supports;

Fig. 2 is a perspective view of the conduit and cable clamp shown in Fig. 1 with the addition of a bridle ring formed from flat sheet metal;

Fig. 3 is a vertical section through the conduit and cable clamp shown in Fig. 2;

Fig. 4 is a perspective view of one form of bridle ring which I preferably employ;

Fig. 5 is a perspective view of my conduit and cable clamp used in combination with a wire bridle ring;

Fig. 6 is a perspective view of the wire bridle ring shown in Fig. 5;

Fig. 7 is a perspective view of still another modification of my invention, in which the lower end of the conduit or cable clamp is bent out to form a flange within which a socket or recess is formed;

Fig. 8 is a perspective view of the conduit or cable clamp shown in Fig. 7, but with the addition of my bridle ring formed out of a flat strip of spring metal;

Fig. 9 is a perspective view of another modification in which a wire bridle ring is used;

Fig. 10 is a perspective view of still another modification in which a part of the hook portion is struck up, or depressed, to form a hook to coöperate with one end of the bridle ring;

Fig. 11 is a vertical section through the conduit and cable clamp and bridle ring shown in Fig. 10;

Fig. 12 is another modification in which the socket or recess is formed by striking up a portion of the base at right angles to that shown in Fig. 1;

Fig. 13 is a perspective view of the conduit or cable clamp shown in Fig. 12, with the addition of a wire bridle ring having a hook which coöperates with the socket or recess formed in the base portion;

Fig. 14 is a perspective view of the bridle ring used with the conduit or cable clamp shown in Figs. 12 and 13.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demands it, my bridle ring may be supported by the same conduit or cable clamp, when the complete combination would be used.

In my invention I form my conduit or cable clamp 1 with a hook portion 2 and a base 3. Preferably, though not necessarily, this conduit or cable clamp is formed of pressed sheet metal. Near the bottom portion 4 of the base, I form an integral socket or recess 5 by striking up the portion 6 of the base, so that it lies in a plane parallel to the rest of the base 3.

Preferably, though not necessarily, it is below the securing screw 7. I also provide the conduit or cable clamp with means to secure the other end of the bridle ring, whatever form of bridle ring that form may be. In Fig. 1 I have shown the conduit provided with an elongated hole 8 to receive the hook 9 upon the flat spring bridle ring, 10, Fig. 4. Preferably, though not necessarily, this hole 8 lies on the opposite side of the securing screw 7 from the socket or recess 5.

The conduit or cable clamp 23 supports the cable 11 on the wall or other suitable support 12 by means of the screw 7, which may be screwed into said wall before attaching the bridle ring 10.

Whenever it becomes necessary to increase the capacity of the installation by stringing bridle wires 13, 13, this can be easily done by hooking the hook 14 of the bridle ring 10 within the socket or recess 5 and then springing the other hook 9 into the hole 8, when the bridle wires 13, 13 can be strung as shown in Fig. 2. It will be noted that in this form of my invention that the hooks 9 and 14 fit snugly in the elongated socket or recesses 5 and 8 respectively, so that there is no rattling or movement between the cable clamp and the bridle ring after they have once been positioned. Moreover the bridle wires 13, 13 are completely inclosed and cannot work free of the bridle ring. In this form of my invention the hook 9 extends up very slightly into the dead space 15, Fig. 3, so that the hook 9 securely holds one end of the bridle ring but does not touch, cut, scratch or mar the cable 11.

Should it ever be desirable to remove the bridle wires 13, 13 this can be easily done by compressing the bridle ring 10 so as to release the flat hook 9 from the elongated hole 8 which will then permit the hook 14 to be lifted out of the socket or recess 5.

In some cases I may use a round wire bridle ring as shown in Figs. 5 and 6. In this form of my invention the cable or conduit clamp 16 is provided with a hook portion 17, base 18 and socket or recess 19 by stamping out the strap 20 all in the same manner as previously described for the other form. The conduit or cable clamp is preferably provided with a hole or opening 21 to receive the hook 22, Fig. 6 of the wire bridle ring 123. The other end of this wire bridle ring is preferably bent back upon itself to form a U-shaped member 124. This member fits snugly in the socket or recess 19 so that there is no rattling or movement of the parts after it has once been positioned. The hook 22 is sprung into the opening 21 in the same manner as previously described in the other form.

In some cases I may form my conduit or cable clamp 23, Fig. 7, with an outwardly extending flange 24, provided with an elongated socket or recess 25. I also provide my conduit or cable clamp with an elongated opening 26, to receive the end 9 of the flat spring bridle ring 10. The end 14 of this bridle ring coöperates with the socket or recess 25 in the same manner as it coöperates with the socket or recess 5, Fig. 1. The hook 9 coöperates with the elongated opening 26.

I may also use my wire bridle ring 123 with a conduit or cable clamp 27, Fig. 9, in which the flange 28 is the same as the flange 24, Fig. 7 and is provided with an elongated socket or recess 29 the same as the form shown in Fig. 7. Preferably, though not necessarily, I provide the conduit or cable clamp 27 with a small opening 30 to receive the hook 22 of the bridle ring 123, Fig. 6.

In some cases I may use still another form of my invention, Fig. 10, in which the conduit or cable clamp 31 is provided with a base portion 32, and a hook portion 33. This hook portion has a part 34 struck from it, Figs. 10 and 11, to form an engaging surface 34 to coöperate with the hook 9 of the flat spring bridle ring 10. In this form the flange 35 is provided with a socket or recess 36 to receive the hook 14 of the bridle ring 10. In this form of my invention the hook portion 9 does not extend into the dead space 15, as shown for example in the construction of Fig. 3.

Another modification of my invention is shown in Figs. 12, 13 and 14. I form a cable or conduit clamp 37 with a hook portion 38 and a base 39. A portion of the base is struck up at right angles to the struck up portion shown in Fig. 1, forming a socket or recess 40. I also provide the conduit or cable clamp with an opening 41 to receive the hook 42 of the wire bridle ring 43, Fig. 14. The other end of this bridle ring is bent out and back upon itself to form a hook 44, Figs. 13 and 14. In positioning the bridle ring 43, the hook 14 is threaded through the socket or recess 40 from the side until it assumes the position shown in Fig. 13, when by simple manipulation the hook 42 can be snapped into the hole 41, which firmly but removably holds the bridle ring 43 to the conduit or cable clamp 37.

It will be noted that in all forms of my improved construction no tapping or screw-threading of the conduit or cable clamp is required, nor is it necessary to place screw threads upon any one of the different forms of bridle rings which I employ. This of course saves considerable expense in the manufacture of the article, and reduces the amount of metal necessary to make the conduit or cable clamp.

Having thus described this invention in connection with illustrative embodiments thereof, to the details of which I do not desire to be limited, what is claimed as new and what is desired to secure by Letters Patent is set forth in the appended claims.

What I claim is:—

1. A conduit or cable clamp provided with a hook portion to receive and hold a conduit or cable, a base to lie against a wall or other suitable support, the base being provided with a hole for a securing screw, and means on either side of the hole for the securing screw to receive the two ends of a bridle ring.

2. A conduit or cable clamp provided with a hook portion and a base, said clamp being provided with means adjacent the hook portion and the lower part of the base to receive the two ends of a bridle ring.

3. A conduit or cable clamp provided with a hook portion and a base, said base being provided with a recess to receive one end of a bridle ring, the hook being also provided with means to receive the other end of a bridle ring.

4. A conduit or cable clamp provided with a hook portion and a base formed out of sheet material, said base being provided with a socket or recess to receive one end of a bridle ring, the hook being also provided with means to receive the other end of a bridle ring.

5. A conduit or cable clamp formed out of sheet material having a base and a hook portion, the base being provided with an elongated socket or recess in the base to receive one end of a bridle ring, the hook being also provided with means to receive the other end of a bridle ring.

6. The combination of a conduit or cable clamp formed out of sheet material having a hook portion and a base, the base having a struck up portion to hold one end of a bridle ring, means carried by the clamp to hold the other end of a bridle ring, and a bridle ring, having one of its ends held by the struck up portion of the base, and its other end held by the other means carried by the clamp.

7. The combination of a conduit or cable clamp having a hook portion adapted to receive and hold a conduit or cable and a base to lie against a wall or other support, said conduit or cable clamp being provided with engaging means to coöperate with both ends of a bridle ring, and a closed bridle ring formed of flat sheet material each of its ends bent back to form hooks to coöperate with the engaging means of the conduit or cable clamp, the bridle ring adapted to surround runs of bridle wires and prevent their accidental disengagement from the bridle ring and clamp.

8. A conduit or cable clamp provided with a hook portion and a base, the base being provided with a pocket or recess with openings arranged transversely to the longitudinal axis of the clamp, and extending toward either side of the clamp.

9. A conduit or cable clamp provided with a hook portion and a base, the cable clamp being provided with means to receive one end of a bridle ring, and the base being provided with a pocket or recess having openings extending parallel to the longitudinal axis of the conduit or cable clamp.

10. A conduit or cable clamp formed from pressed sheet material having a hook portion and a base, the clamp being provided with means to engage with one end of a bridle ring, the base having a longitudinally extending portion struck up to form a pocket or recess extending longitudinally of the conduit or cable clamp and provided with open sides.

11. The combination of a conduit or cable clamp provided with a hook portion and a base, the base being provided with a pocket or recess with openings arranged transversely to the longitudinal axis of the clamp, and a bridle ring having both its ends secured to said conduit or cable clamp.

12. The combination of a conduit or cable clamp formed from pressed sheet material having a hook portion and a base, the clamp being provided with means to engage with one end of a bridle ring, the base having a longitudinally extending portion struck up to form a pocket or recess extending longitudinally of the conduit or cable clamp and provided with open sides and a bridle ring one of its ends secured by said means and the other end secured in said pocket or recess.

13. The combination in a conduit or cable clamp having a hook portion to directly contact with and hold a conduit or cable against the surface of a wall or other suitable support, rigid non adjustable means on the conduit or cable clamp to hold both ends of a bridle ring, and a wire bridle ring having both its ends securely held by the rigid non adjustable means on the conduit or cable clamp.

14. The combination of a conduit or cable clamp formed out of sheet material having a hook portion and a base, the base having a struck up portion to hold one end of a wire bridle ring, means carried by the clamp to hold the other end of a wire bridle ring, and a wire bridle ring having one of its ends held by the struck up portion of the base, and its other end held by the other means carried by the clamp.

HENRY W. PLEISTER.

Witnesses:
MARY R. RYAN,
A. M. WILLIAMS.